US011022794B2

(12) United States Patent
Sztuk et al.

(10) Patent No.: US 11,022,794 B2
(45) Date of Patent: Jun. 1, 2021

(54) VISUAL INDICATORS OF USER ATTENTION IN AR/VR ENVIRONMENT

(71) Applicant: Facebook Technologies, LLC, Menlo Park, CA (US)

(72) Inventors: Sebastian Sztuk, Menlo Park, CA (US); Javier San Agustin Lopez, Palo Alto, CA (US); Anders Bo Pedersen, San Francisco, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/512,952

(22) Filed: Jul. 16, 2019

(65) Prior Publication Data

US 2020/0209624 A1 Jul. 2, 2020

Related U.S. Application Data

(60) Provisional application No. 62/785,642, filed on Dec. 27, 2018.

(51) Int. Cl.
*G02B 27/00* (2006.01)
*H04N 13/332* (2018.01)
*G02B 27/01* (2006.01)
*G06F 3/01* (2006.01)
*G06T 19/00* (2011.01)

(52) U.S. Cl.
CPC ....... *G02B 27/0093* (2013.01); *G02B 27/017* (2013.01); *G06F 3/013* (2013.01); *G06T 19/00* (2013.01); *H04N 13/332* (2018.05); *G02B 2027/014* (2013.01); *G02B 2027/0141* (2013.01)

(58) Field of Classification Search
CPC ...... G02B 2027/014; G02B 2027/0141; G02B 27/0093; G02B 27/017; G06F 3/011; G06F 3/013; H04N 13/332; H04N 7/157; G06T 19/009

See application file for complete search history.

(56) References Cited

U.S. PATENT DOCUMENTS

| 9,451,210 | B1* | 9/2016 | Smus | G06F 3/04842 |
| 10,162,651 | B1* | 12/2018 | Zhu | B60K 35/00 |
| 2010/0220897 | A1 | 9/2010 | Ueno et al. | |
| 2013/0241805 | A1* | 9/2013 | Gomez | G06F 3/013 345/8 |
| 2014/0368543 | A1 | 12/2014 | Hamilton, II et al. | |
| 2015/0235434 | A1 | 8/2015 | Miller | |
| 2016/0027218 | A1 | 1/2016 | Salter et al. | |

(Continued)

OTHER PUBLICATIONS

PCT/US2019/067729 Search Report dated Mar. 18, 2020.

*Primary Examiner* — Michelle L Sams
(74) *Attorney, Agent, or Firm* — Pequignot + Myers; Matthew A. Pequignot

(57) ABSTRACT

A method of notifying a user about attention from another user in an augmented reality/virtual reality (AR/VR) system is provided. The method includes displaying a first image on a first electronic display to a first user of the AR/VR system and, upon detecting a gaze of the first user at a second user of the AR/VR system or the second user's avatar in the first image, notifying the second user about the gaze of the first user by displaying a second image on a second electronic display to the second user, the second image having a visual cue of the gaze of the first user.

19 Claims, 8 Drawing Sheets

(56) References Cited

U.S. PATENT DOCUMENTS

| | | |
|---|---|---|
| 2016/0093108 A1 | 3/2016 | Mao et al. |
| 2017/0171261 A1 | 6/2017 | Smus |
| 2018/0101989 A1* | 4/2018 | Frueh ................. G06K 9/00255 |
| 2018/0232928 A1 | 8/2018 | Grant |
| 2019/0272028 A1* | 9/2019 | Hong ........................ G06T 7/70 |

* cited by examiner

VISUAL INDICATORS OF USER ATTENTION IN AR/VR ENVIRONMENT

REFERENCE TO A RELATED APPLICATION

The present application claims priority from U.S. Provisional Application No. 62/785,642, filed on Dec. 27, 2018, entitled "VISUAL INDICATORS OF USER ATTENTION IN AR/VR ENVIRONMENT" and incorporated herein by reference for all purposes.

TECHNICAL FIELD

The present disclosure relates to visual displays and display systems and, in particular, to wearable displays and methods therefor.

BACKGROUND

Wearable displays can be used to present virtual images to a user, or to augment real world images with dynamic information, data, or virtual objects. Virtual reality (VR) or augmented reality (AR) scenery can be three-dimensional to enhance the experience and to match virtual objects to real objects observed by the user. Eye position and gaze direction, and/or orientation of the user in space may be tracked in real time, and the displayed scenery may be dynamically adjusted depending on the user's head orientation and gaze direction, to provide a better experience of immersion into a simulated or augmented environment.

Wearable displays can be used to simulate or augment social interactions between users. For instance, in a virtual conference application, users, represented by avatars in a virtual conference room, may interact with each other by talking to each other, presenting information to a group of users, etc. One drawback of an AR/VR simulation of a social gathering event is that users may feel isolated or disoriented by the AR/VR environment, making social contacts between the users less straightforward.

SUMMARY

Methods and systems disclosed herein may be employed to enable users to attract attention of other user(s) in an AR/VR environment. An AR/VR system may include a plurality of wearable displays to be worn by different users, and a controller. The wearable displays may each include a visual display module for displaying VR images to the user and/or to augmenting observed outside world with AR imagery and signs, an eye-tracking system for determining such parameters as the user's gaze direction, vergence, eye dilation, etc. in real time, and an audio system for audio communication with other users. The controller may include a remote or a distributed computing system and a communication network connecting the controller to the wearable displays so that the wearable displays are communicatively coupled with the controller. The term AR/VR used herein includes AR systems, VR systems, any combination thereof, including Mixed reality (MR) systems. Examples of AR/VR systems will be given further below.

A wearable display of a particular user may show images representing other user(s) of the system. The method enables a user of an AR/VR system to notice when another user of the system looks at them. The users represented on the screen may be located far away and not visible to the user wearing a particular wearable display, and may be represented by avatars. In some AR embodiments, the users may view other users directly through their AR headsets.

In accordance with the present disclosure, there is provided a method in a wearable display of an augmented reality/virtual reality (AR/VR) system. The method includes: displaying, using the wearable display, an image to a second user of the AR/VR system, the image comprising a visual cue of a gaze of a first user of the AR/VR system directed to the second user or an avatar of the second user, wherein the gaze of the first user directed to the second user or the avatar of the second user has been detected by a processor executing instructions to process eye tracking data of the first user.

In accordance with the present disclosure, there is provided a non-transitory memory having stored thereon instructions which, when executed by one or more processors, cause the one or more processors to display, using a wearable display of an AR/VR system, an image to a second user of the AR/VR system, the image comprising a visual cue of a gaze of a first user of the AR/VR system directed to the second user or an avatar of the second user, wherein the gaze of the first user directed to the second user or the avatar of the second user has been detected by a processor executing instructions to process eye tracking data of the first user.

In accordance with the present disclosure, there is further provided an AR/VR system including:
a first wearable display comprising an eye tracking system and a first electronic display for displaying a first image to a first user;
a second wearable display comprising a second electronic display for displaying a second image to a second user; and
a controller communicatively coupled to the first and second wearable displays and configured to provide data to the first wearable display for displaying the first image, the controller comprising an attention monitor configured to receive data related to eye tracking of the first user from the first wearable display and identifying a gaze of the first user directed to the second user or an avatar of the second user in the first image, the controller configured to, upon detecting the gaze, provide data to the second wearable display for displaying the second image to the second user, the second image comprising a visual cue of the gaze of the first user.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. The term "plurality" is used herein to mean as "two or more," and the word "include" is used in a same sense as the word "comprise".

Figure 1:
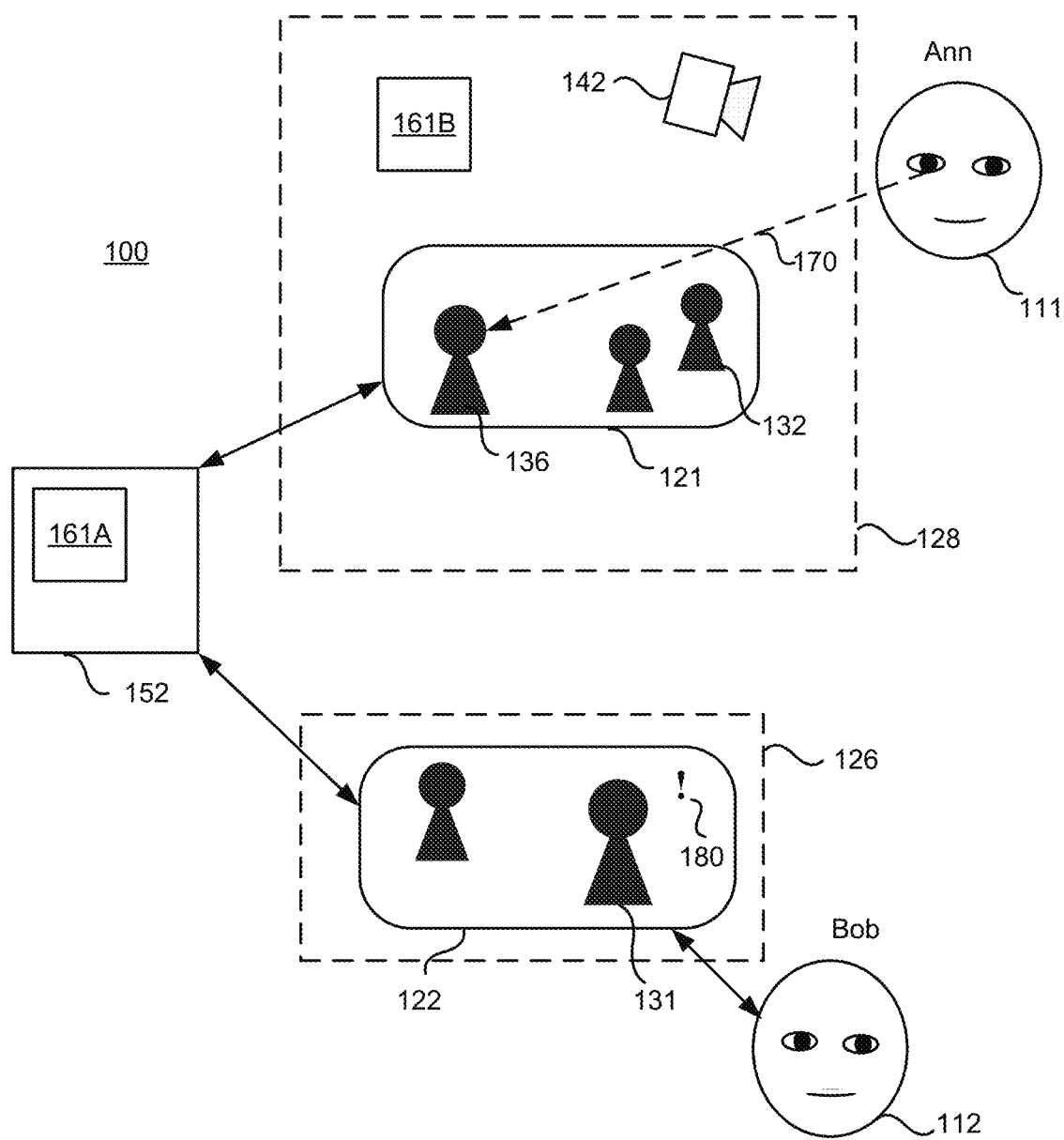
FIG. 1 is a block diagram of an AR/VR system in accordance with the present disclosure.

With reference to FIG. 1, an AR/VR system 100 enables interaction of two or more users, such as users Ann (111) and Bob (112). The system 100 includes a controller 152 connected via a network with two or more wearable displays 128 (Ann's wearable display) and 126 (Bob's wearable display). Each wearable display 126, 128 includes an electronic display, i.e. Ann's wearable display 128 includes an electronic display 121 and Bob's wearable display 126 includes an electronic display 122. The images are formed using data received from the controller 152.

The image generated by Ann's wearable display 128 may include an image captured by a wide-angle camera, or may include an entirely VR generated image. The VR generated image may represent multiple users and, in particular, may include an image 136 representing Bob. Herein, the image 136 representing Bob is referred to as Bob's avatar 136. Bob's avatar 136 may be a still image or a dynamic image, an icon, a graphic representation, an animated image, etc. In AR embodiments, Ann may look at Bob directly through an AR headset which transmits outside light enabling a direct view of the outside world, while augmenting the real views with computer-generated graphics and other computer-generated imagery. In such embodiments, the real-world view of Bob may be augmented with an attention cue, e.g. outer glow, a sign, etc. The same holds for other users and images representing the other users to one another, i.e. the other user's avatars 131, 132, and 136. In some AR embodiments, there could be virtual avatars and real people placed in a same scene. Furthermore, users can dial in by phone and be placed in the scene by placing an avatar representing the dialed-in users.

Figure 2:
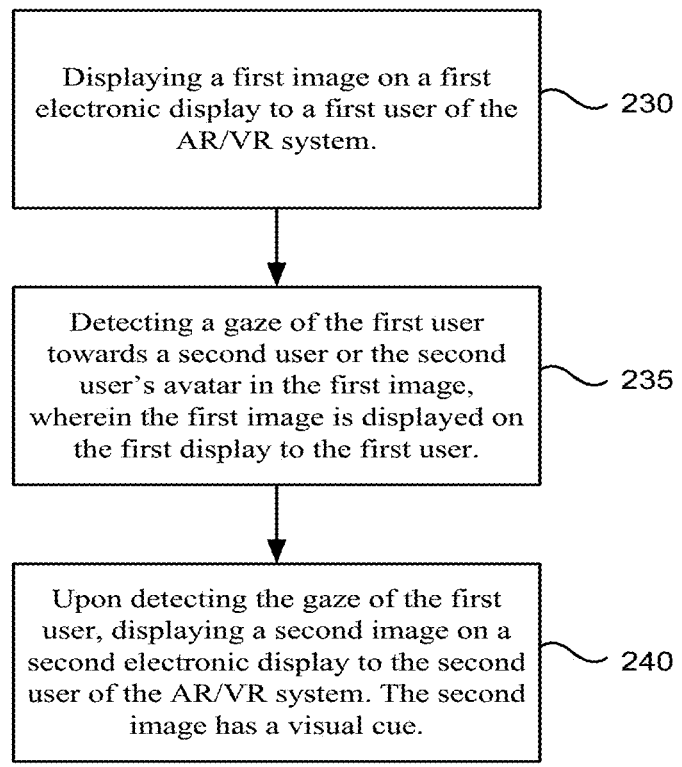
FIG. 2 is a flowchart of a method in the AR/VR system of FIG. 1.

FIG. 2 is a flowchart of a method for presenting visual cues in accordance with the present disclosure. The method includes displaying (230) a first image on a first electronic display to a first user of the AR/VR system. In the example shown in FIG. 1, the first user 111 is Ann, the first electronic display is her electronic display 121, and the image 136 represents Bob.

With further reference to FIG. 1, the first wearable display 128 of the AR/VR system 100 includes an eye tracking system 142, which collects data about the eyes of the first user, and provides the obtained data to an attention monitor 161 (shown as 161A and 161B in FIG. 1). Preferably, the second wearable display 126 also includes an eye tracking system, so that Ann could be notified of Bob's gaze, as well.

The attention monitor 161 is a functional block including one or more local parts 161B within the wearable displays such as Ann's wearable display 128, and a central part 161A within the controller 152. Some functionality may be implemented either by the local part 161B at the user location or by the central part 161A at the central location. The attention monitor 161 may be implemented in instructions stored in computer readable storage medium and executed by hardware processor(s).

The attention monitor 161 synchronizes the information obtained by the eye tracking system 142 and the information related to the image currently displayed on the electronic display 121 to identify whether Ann looks at Bob, e.g. looks at Bob directly in AR applications, or looks at Bob's avatar 136 in VR applications. In FIG. 1, a line 170 indicates a particular direction of Ann's gaze when Ann looks at Bob's avatar 136.

In this example, Ann looks at Bob's avatar 136. Ann may shift her attention to the image 132 representing another user. The attention monitor 161 may distinguish between images 136 and 132, based on the initial information used for forming the image provided to the electronic display 121. The attention monitor 161 has information identifying which portion of the electronic display 121 is occupied by an image of a particular user. For AR applications, each AR headset may be equipped with a position sensor or position indicator enabling the AR/VR system 100 to determine in real time where each user is located in 3D space. This information, together with the gaze direction and/or vergence in 3D space for various users, enables the AR/VR system 100 to determine for each user, in real time, which other user or users are likely looking at that particular user. For example, if Bob is in a real-world location A, and Ann happens to look at the same real-world location A in 3D space, the AR/VR system 100 may determine that Ann is looking a Bob.

For the purpose of identifying a duration of gaze of one user directed to another user of the AR/VR system 100, the attention monitor 161 may calculate a time duration of Ann's gaze at Bob or Bob's avatar 136. The gaze duration may be defined as uninterrupted, continuous gaze at a particular image, such as Bob's avatar 136, or at a particular person or a 3D space location in AR applications, during a predefined time interval. The gaze detection condition may be configured as viewing the particular image for at least a predefined time interval T1. When the gaze detection condition is satisfied, the occurrence of gaze is detected.

With further reference to FIG. 2, the method further includes detecting (235) a gaze. The detecting 235 comprises detecting the gaze 170 of the first user (Ann in this case) towards a second user (Bob) or the second user's avatar (Bob's avatar 136) in the first image displayed on the first electronic display 121 to the first user (Ann). The detecting 235 may include tracking eye movements of the first user by an eye tracking unit, e.g. the eye tracking system 142. The detecting may include a condition that the gaze duration is longer than a pre-defined threshold amount of time. The detecting may also take into account some eye characteristics like pupil dilation of the first user. The dilated pupils may indicate an elevated level of attention. Similarly, when the attention monitor 161 determines that one user pays attention to another user, the other user is notified. For example, when the monitor 161 detects a gaze 170 from Ann towards the image 136 related to Bob, the controller 152 notifies Bob.

With further reference to FIG. 2, the method further includes a notification 240. The notification 240 may include displaying, upon detecting the gaze of the first user, a second image on the second electronic display 122 to the second user of the AR/VR system 150. The second image has a visual cue or a sign indicating the gazing by the first user 111 directed to the second user 112 or the second user's avatar. In the example shown in FIG. 1, the notification step 240 includes displaying an image on the Bob's electronic display 122, the image having a visual cue 180 proximate the image 131 representing the first user 111 (Ann).

The notification may include any visual information such as a sign, a visual cue, a text, a symbol, and/or some modification of Ann's avatar 131, such as color, contrast, brightness, outline, etc., added to the Ann's image displayed to Bob on his display 122. The visual cue may represent an artificial image or feature provided by Bob's AR headset. In FIG. 1, the visual cue is an exclamation mark 180 near Ann's avatar 131. Other non-limiting examples of visual cues include vibration of Ann's avatar 131, shimmering or glow of Ann's avatar 131, etc. The visual cue may be proximate to the image of the gazing user, on the image, or be an alteration of the image such as glow or movements. Preferably, the visual cue is predefined and easily noticeable, although the visual cue may remain reasonably subtle. The purpose of the visual cue is to attract attention of the second user to the first user, in response to the identified gaze of the first user at or towards the second user. In some embodiments, the sign may be a text on the display, or even a voice notification.

From the point of view of the second user, Bob 112, the method includes displaying, using the wearable display 126 of the AR/VR system 100, an image to Bob, wherein the image has a visual cue of a gaze of a first user of the system, Ann 111, the gaze directed to the second user or an avatar of the second user. The gaze of the first user directed to the second user through the wearable display, or to the avatar of the second user on the screen 121 of the wearable display 128 has been detected by a processor executing instructions to process eye tracking data of the first user. The visual cue may be displayed when the processor executing instructions has determined that eyes of the first user have been looking at the second user or the second user's avatar for at least a predefined time interval. The visual cue may be displayed when a gaze direction of the first user at the second user has been detected, and/or when a gaze vergence of the first user at the second user has been detected. The gaze direction and/or gaze vergence may be determined by the processor at regular time intervals. The method may include modifying the image to remove the visual cue when the gaze has been withdrawn referably, the image displayed to the second user has been absent the visual cue before the gaze of the first user directed to the second user or the avatar of the second user has been detected.

Figure 3:
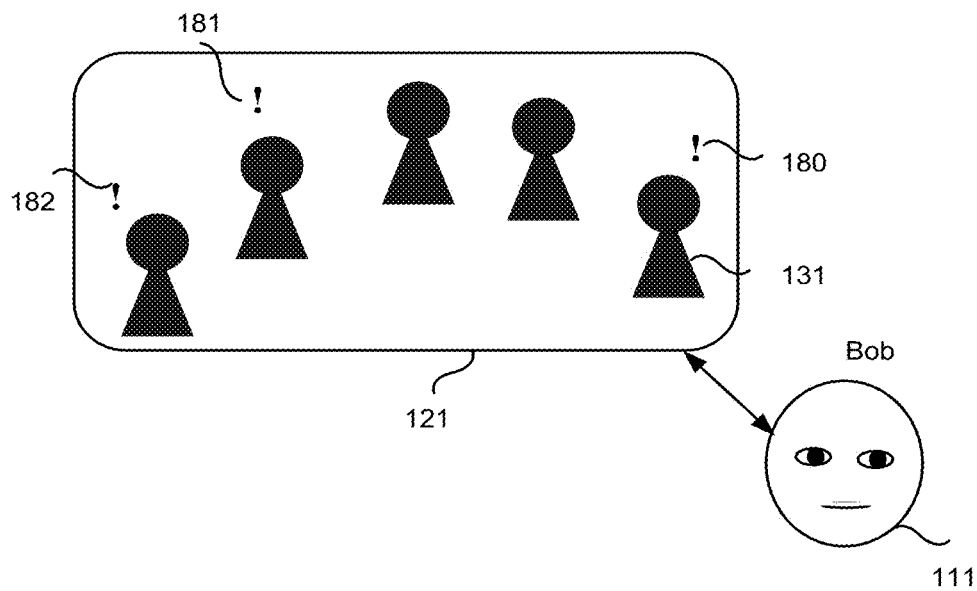
FIG. 3 is a diagram illustrating one embodiment of the method of FIG. 2.

The method may be used to notify a user of concurrent attention of several other users represented on that user's display. With reference to FIG. 3, the second user Bob 112 has five images on his display 122, and the system has detected close attention of three people, identified by their gazes as described above. The visual cues 180,181,182 are provided on Bob's display 122. Each of the visual cues may be disposed next to/in close proximity to a particular user or their image, or directly on the image or avatar (for cues such as glow or vibration representing a minor modification of the image). A visual cue may be provided for an image representing a particular user or closer to that image than to images representing other users on the same screen, in order to identify only one of the users and make it clear to which particular user the cue refers to. For example, the system may be constrained to provide a cue closer to the head of a particular user than to any of the heads of other users represented concurrently on the display.

The method may be performed in real time. The AR/VR system 100 can receive updated eye tracking information at regular time intervals as the user's eyes shift between different areas of the screen, and the display system can compute the point of regard, i.e. the gaze point, which is the point in the screen at which the user is looking, based on the updated eye tracking information. Preferably, the point of regard, represented by gaze direction and gaze vergence, is identified at predefined regular time intervals. As described above, the second user is notified as soon as the gaze of the first user is detected. Then the system continues monitoring the gaze of the first user 111. When the attention of the first user 111 moves elsewhere, the visual cue indicating the previously detected gaze may disappear. The gaze withdrawal condition may be configured as continuing looking at the second user 112 for less than a predefined time interval T2. The two time intervals, T1 (detection of gaze threshold time) and T2 (withdrawal of gaze) may be equal, T1=T2, though not necessarily. The attention monitor 161 may also be configured to detect natural eye and/or head movements of users for the purpose of limiting the duration of the eye contact to a comfortable duration of time. In other words, the first user may briefly look at the floor, turn their head from side to side, etc. The attention monitor 161 may be configured to allow such movements for a "brief withdrawal time" T3 without removing visual cue(s) of attention. When the gaze withdrawal condition is satisfied, the image displayed at the second display 122 changes so that the visual cue 180 disappears.

Eventually, the first user 111 may return their attention to the second user 112. When the gaze detection conditions are satisfied, the visual cue appears on the second display about the image of the first user 111. Herein, the visual cue indicates attention, and the absence of the cue indicates the lack of attention. Accordingly, the visual cue was absent directly before the gaze has been detected again, for at least a predefined time interval, e.g., T1/2.

Figure 4:
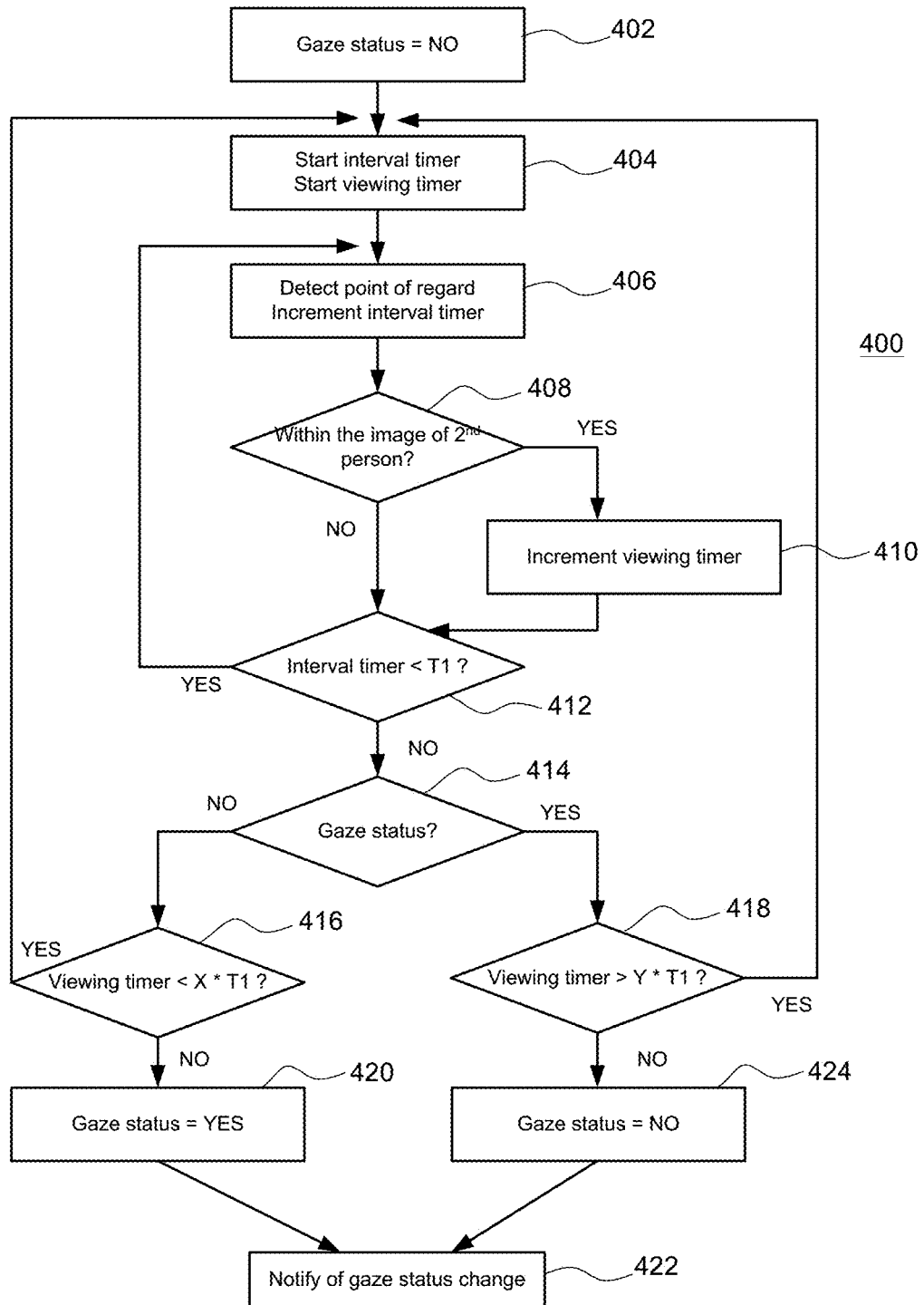
FIG. 4 is a flow chart of an exemplary method for an attention monitor of the AR/VR system of FIG. 1.

FIG. 4 is a flow chart of an exemplary method 400 employed by the attention monitor 161 for detecting the presence or absence of a gaze of the first user 111 towards the second user 112. Initially (402) the gaze status is No. The interval timer is started (404), and a point of regard is detected (406). If the point of regard is within the image of the second person (408), the viewing timer is incremented (410). If not and if the interval timer is <T1 (412), then the process goes back to detecting the point of regard (406). If No, then the gaze status is determined (414). In this example, the gaze detection condition is configured as viewing a particular image for at least a predefined portion X of the time interval T1, and the gaze withdrawal condition is configured as viewing the particular image for less than a predefined portion Y of the time interval T2. IF no gaze and the viewing timer is <X*T1 (416), then the process restarts interval timer (404). IF the viewing timer is >X*T1 (418), the gaze status is YES (420) and the second user is notified of the gaze change (422). If the gaze persists and the viewing timer is >X*T1, then the process also restarts interval timer (404). If the viewing timer is <X*T1, then the gaze status is No (424) and the second user is notified of the gaze change (418). The gaze of the users may be monitored continuously over time.

For the illustrative purposes T1=T2 and possible gazes of the first 111 user towards other users represented on the first electronic display 121 are not accounted for. Of course, other method may be employed, in particular a sliding time window may be used.

The first 111 and second 112 users may be people so that their gaze may be captured by an eye-tracking device. However, the second user 112, who is notified of the attention paid by the first user, may also be a machine, a computer, or a robot.

Figure 5A:
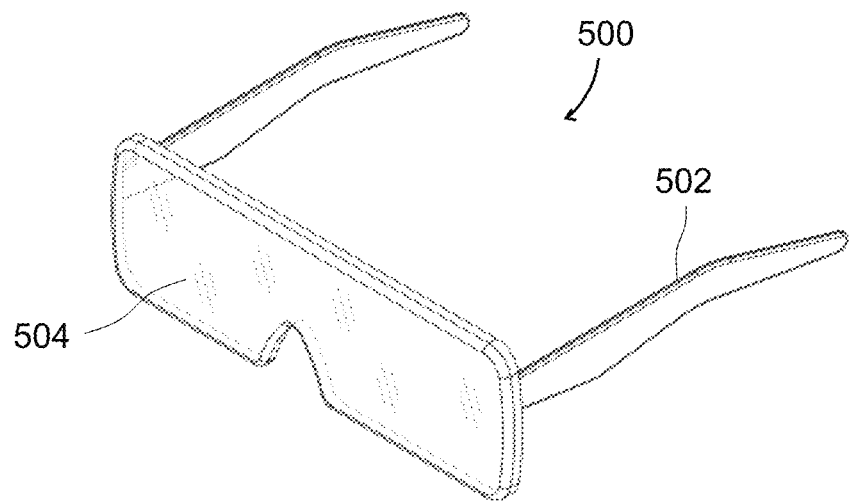
FIG. 5A is an isometric view of an eyeglasses form factor near-eye augmented reality (AR)/virtual reality (VR) wearable display embodiment.
Figure 5B:
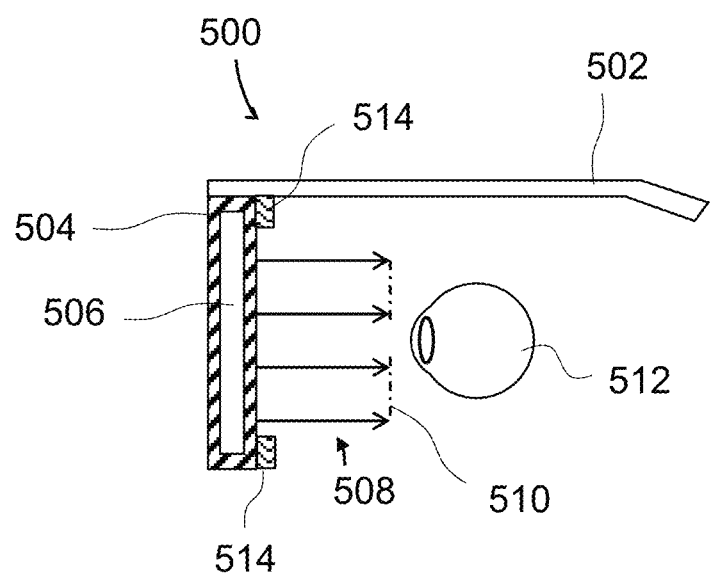
FIG. 5B is a side cross-sectional view of the AR/VR wearable display of FIG. 5A.

Referring to FIGS. 5A and 5B, a near-eye AR/VR display 500 is an embodiment of the wearable displays 126, 128. A body or frame 502 of the near-eye AR/VR display 500 has a form factor of a pair of eyeglasses, as shown. A display 504 includes a display assembly 506 (FIG. 5B) provides image light 508 to an eyebox 510, i.e. a geometrical area where a good-quality image may be presented to a user's eye 512. The display assembly 506 may include a separate near-eye AR/VR display module for each eye, or one AR/VR display module for both eyes.

An electronic display of the display assembly 506 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. Waveguide structures may be provided to convey the images generated by the displays to the user's eyes. In AR applications, transparent or semi-transparent waveguide structures may extend over the display assembly 506. The waveguides may include selective reflectors and diffraction gratings. The waveguides may also include pupil-replicating waveguide sections. The near-eye AR/VR display 500 may also include an eye-tracking system 514 for determining, in real time, the gaze direction and/or the vergence angle of the user's eyes 512. The determined gaze direction and gaze vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye coherent AR/VR display 500 may include an audio system, such as small speakers or headphones and/or a microphone. Stereo microphones on the display assembly may be used so as to recognize the location and/or direction of people in the room. In some embodiments, face recognition may be used to determine the presence of a person in the scene; simultaneous localization and mapping (SLAM) cameras or internet-connected (IoT) cameras may be employed for that purpose.

Figure 6A:
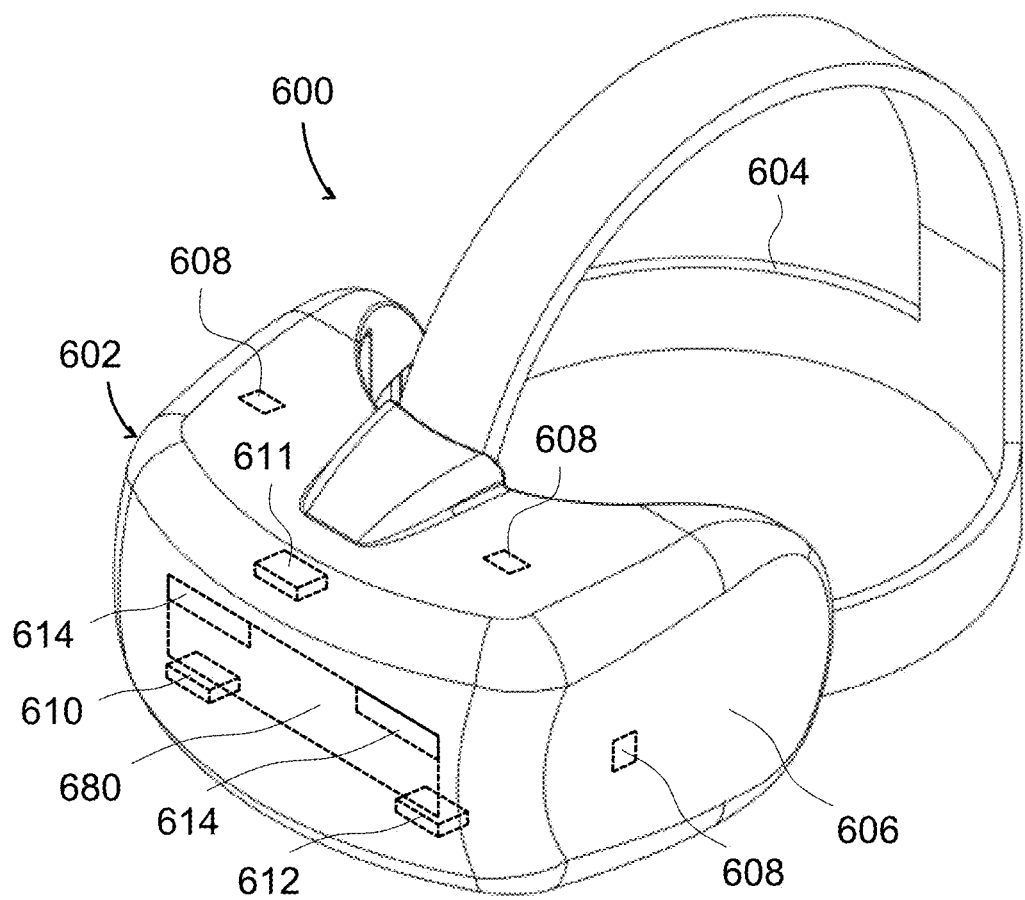
FIG. 6A is an isometric view of a head-mounted display headset of the present disclosure.

Referring to FIG. 6A, an HMD 600 is an example of an AR/VR wearable display system which encloses the user's face, for a greater degree of immersion into the AR/VR environment. The function of the HMD 600 is to augment views of a physical, real-world environment with computer-generated imagery, and/or to generate the entirely virtual 3D imagery. The HMD 600 may include a front body 602 and a band 604. The front body 602 is configured for placement in front of eyes of a user in a reliable and comfortable manner, and the band 604 may be stretched to secure the front body 602 on the user's head. A display system 680 may be disposed in the front body 602 for presenting AR/VR imagery to the user. Sides 606 of the front body 602 may be opaque or transparent.

In some embodiments, the front body 602 includes locators 608 and an inertial measurement unit (IMU) 610 for tracking acceleration of the HMD 600, and position sensors 612 for tracking position of the HMD 600. The IMU 610 is an electronic device that generates data indicating a position of the HMD 600 based on measurement signals received from one or more of position sensors 612, which generate one or more measurement signals in response to motion of the HMD 600. Examples of position sensors 612 include: one or more accelerometers, one or more gyroscopes, one or more magnetometers, another suitable type of sensor that detects motion, a type of sensor used for error correction of the IMU 610, or some combination thereof. The position sensors 612 may be located external to the IMU 610, internal to the IMU 610, or some combination thereof.

The locators 608 are traced by an external imaging device of a virtual reality system, such that the virtual reality system can track the location and orientation of the entire HMD 600. Information generated by the IMU 610 and the position sensors 612 may be compared with the position and orientation obtained by tracking the locators 608, for improved tracking accuracy of position and orientation of the HMD 600. Accurate position and orientation is important for presenting appropriate virtual scenery to the user as the latter moves and turns in 3D space.

The HMD 600 may further include a depth camera assembly (DCA) 611, which captures data describing depth information of a local area surrounding some or all of the HMD 600. To that end, the DCA 611 may include a laser radar (LIDAR) or a similar device. The depth information may be compared with the information from the IMU 610, for better accuracy of determination of position and orientation of the HMD 600 in 3D space.

The HMD 600 may further include an eye tracking system 614 for determining orientation and position of user's eyes in real time. The eye tracking system 614 may include an array of infrared illuminators illuminating both eyes, a hot mirror for separating infrared and visible light, and an eye tracking camera obtaining images of both eyes with reflections (glints) from the illuminators. By comparing the position of glints relative to the position of the eye pupil, the eye position and orientation may be determined. The obtained position and orientation of the eyes also allows the HMD 600 to determine the gaze direction of the user and to adjust the image generated by the display system 680 accordingly. In one embodiment, the vergence, that is, the convergence angle of the user's eyes gaze, is determined. The determined gaze direction and gaze vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers and/or a microphone built into the front body 602.

Figure 6B:
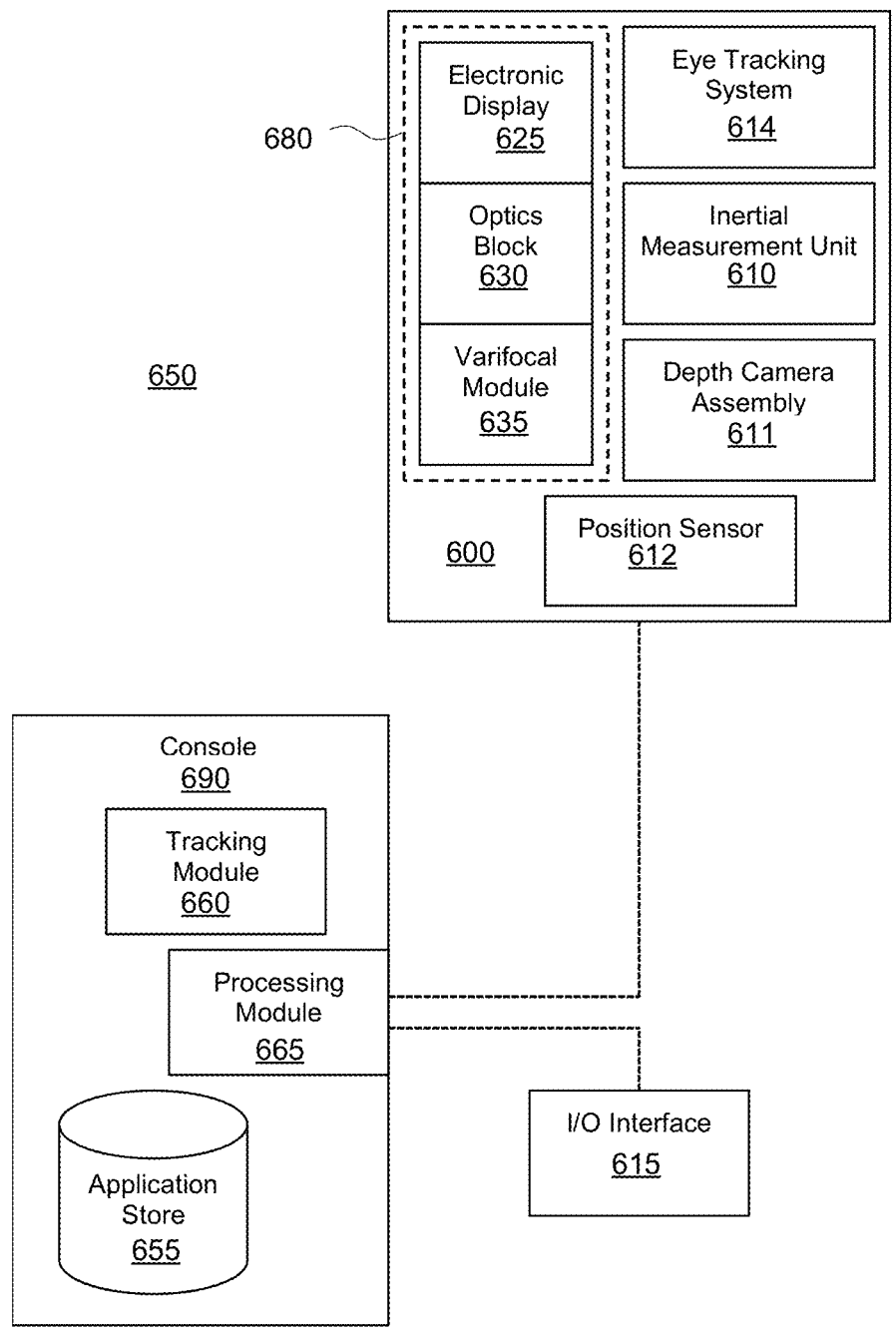
FIG. 6B is a block diagram of a virtual reality system including the headset of FIG. 6A.

Referring to FIG. 6B, an AR/VR system 650 includes the HMD 600 of FIG. 6A, an external console 690 storing various AR/VR applications, setup and calibration procedures, 3D videos, etc., and an input/output (I/O) interface 615 for operating the console 690 and/or interacting with the AR/VR environment. The HMD 600 may be "tethered" to the console 690 with a physical cable, or connected to the console 690 via a wireless communication link such as Bluetooth®, Wi-Fi, etc. There may be multiple HMDs 600, each having an associated I/O interface 615, with each HMD 600 and I/O interface(s) 615 communicating with the console 690. In alternative configurations, different and/or additional components may be included in the AR/VR system 650. Additionally, functionality described in conjunction with one or more of the components shown in FIGS. 6A and 6B may be distributed among the components in a different manner than described in conjunction with FIGS. 6A and 6B in some embodiments. For example, some or all of the functionality of the console 615 may be provided by the HMD 600, and vice versa. The HMD 600 may be provided with a processing module capable of achieving such functionality.

As described above with reference to FIG. 6A, the HMD 600 may include the eye tracking system 614 (FIG. 6B) for tracking eye position and orientation, determining gaze angle and convergence angle, etc., the IMU 610 for determining position and orientation of the HMD 600 in 3D space, the DCA 611 for capturing the outside environment, the position sensor 612 for independently determining the position of the HMD 600, and the display system 680 for displaying AR/VR content to the user. The display system 680 includes (FIG. 6B) an electronic display 625, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 680 further includes an optics block 630, whose function is to convey the images generated by the electronic display 625 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 680 may further include a varifocal module 635, which may be a part of the optics block 630. The function of the varifocal module 635 is to adjust the focus of the optics block 630 e.g. to compensate for vergence-accommodation conflict, to correct for vision defects of a particular user, to offset aberrations of the optics block 630, etc.

The I/O interface 615 is a device that allows a user to send action requests and receive responses from the console 690. An action request is a request to perform a particular action. For example, an action request may be an instruction to start or end capture of image or video data or an instruction to perform a particular action within an application. The I/O interface 615 may include one or more input devices, such as a keyboard, a mouse, a game controller, or any other suitable device for receiving action requests and communicating the action requests to the console 690. An action request received by the I/O interface 615 is communicated to the console 690, which performs an action corresponding to the action request. In some embodiments, the I/O interface 615 includes an IMU that captures calibration data indicating an estimated position of the I/O interface 615 relative to an initial position of the I/O interface 615. In some embodiments, the I/O interface 615 may provide haptic feedback to the user in accordance with instructions received from the console 690. For example, haptic feedback can be provided when an action request is received, or the console 690 communicates instructions to the I/O interface 615 causing the I/O interface 615 to generate haptic feedback when the console 690 performs an action.

The console 690 may provide content to the HMD 600 for processing in accordance with information received from one or more of: the IMU 610, the DCA 611, the eye tracking system 614, and the I/O interface 615. In the example shown in FIG. 6B, the console 690 includes an application store 655, a tracking module 660, and a VR engine 665. Some embodiments of the console 690 may have different modules or components than those described in conjunction with FIG. 6B. Similarly, the functions further described below may be distributed among components of the console 690 in a different manner than described in conjunction with FIGS. 6A and 6B.

The application store 655 may store one or more applications for execution by the console 690. An application is a group of instructions that, when executed by a processor, generates content for presentation to the user. Content generated by an application may be in response to inputs received from the user via movement of the HMD 600 or the I/O interface 615. Examples of applications include: gaming applications, presentation and conferencing applications, video playback applications, or other suitable applications.

The tracking module 660 may calibrate the AR/VR system 650 using one or more calibration parameters and may adjust one or more calibration parameters to reduce error in determination of the position of the HMD 600 or the I/O interface 615. Calibration performed by the tracking module 660 also accounts for information received from the IMU 610 in the HMD 600 and/or an IMU included in the I/O interface 615, if any. Additionally, if tracking of the HMD 600 is lost, the tracking module 660 may re-calibrate some or all of the AR/VR system 650.

The tracking module 660 may track movements of the HMD 600 or of the I/O interface 615, the IMU 610, or some combination thereof. For example, the tracking module 660 may determine a position of a reference point of the HMD 600 in a mapping of a local area based on information from the HMD 600. The tracking module 660 may also determine positions of the reference point of the HMD 600 or a reference point of the I/O interface 615 using data indicating a position of the HMD 600 from the IMU 610 or using data indicating a position of the I/O interface 615 from an IMU included in the I/O interface 615, respectively. Furthermore, in some embodiments, the tracking module 660 may use portions of data indicating a position or the HMD 600 from the IMU 610 as well as representations of the local area from the DCA 611 to predict a future location of the HMD 600. The tracking module 660 provides the estimated or predicted future position of the HMD 600 or the I/O interface 615 to the VR engine 665.

The VR engine 665 may generate a 3D mapping of the area surrounding some or all of the HMD 600 ("local area") based on information received from the HMD 600. In some embodiments, the VR engine 665 determines depth information for the 3D mapping of the local area based on information received from the DCA 611 that is relevant for techniques used in computing depth. In various embodiments, the VR engine 665 may use the depth information to update a model of the local area and generate content based in part on the updated model.

The VR engine 665 executes applications within the AR/VR system 650 and receives position information, acceleration information, velocity information, predicted future positions, or some combination thereof, of the HMD 600 from the tracking module 660. Based on the received information, the VR engine 665 determines content to provide to the HMD 600 for presentation to the user. For example, if the received information indicates that the user has looked to the left, the VR engine 665 generates content for the HMD 600 that mirrors the user's movement in a virtual environment or in an environment augmenting the local area with additional content. Additionally, the VR engine 665 performs an action within an application executing on the console 690 in response to an action request received from the I/O interface 615 and provides feedback to the user that the action was performed. The provided feedback may be visual or audible feedback via the HMD 600 or haptic feedback via the I/O interface 615.

In some embodiments, based on the eye tracking information (e.g., orientation of the user's eyes) received from the eye tracking system 614, the VR engine 665 determines resolution of the content provided to the HMD 600 for presentation to the user on the electronic display 625. The VR engine 665 may provide the content to the HMD 600 having a maximum pixel resolution on the electronic display 625 in a foveal region of the user's gaze. The VR engine 665 may provide a lower pixel resolution in other regions of the electronic display 625, thus lessening power consumption of the AR/VR system 650 and saving computing resources of the console 690 without compromising a visual experience of the user. In some embodiments, the VR engine 665 can further use the eye tracking information to adjust where objects are displayed on the electronic display 625 to prevent vergence-accommodation conflict and/or to offset optical distortions and aberrations.

Figure 7:
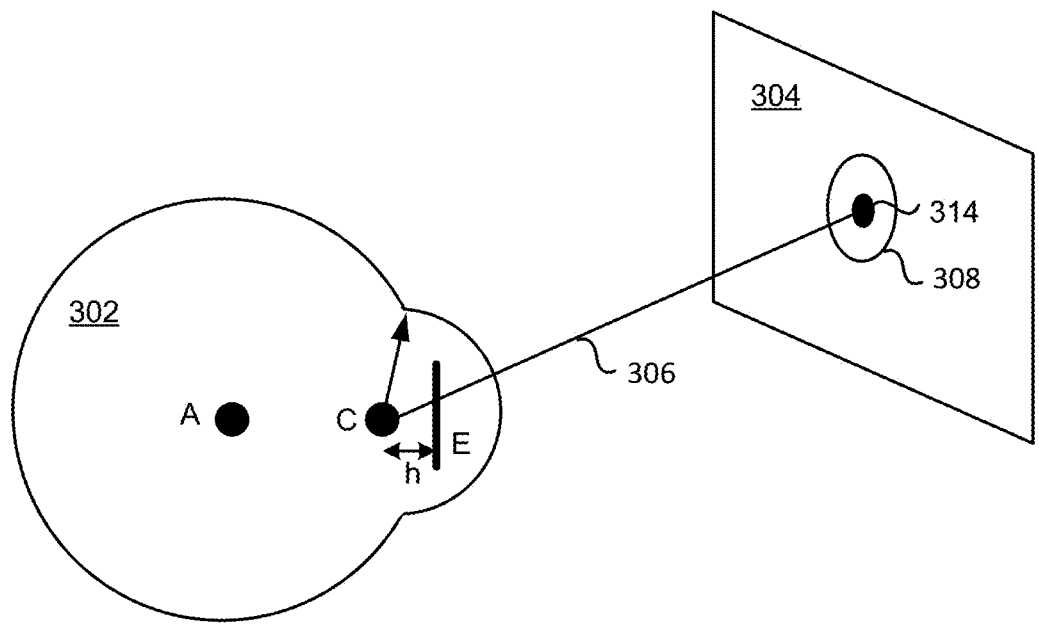
FIG. 7 is a schematic view of an eye gazing at a screen.

FIG. 7 illustrates a user's eye 302 gazing at a screen 304 in a direction indicated by a gaze vector 306, which corresponds to the gaze vector 170 of FIG. 1. FIG. 7 further illustrates a foveal region 308 on the screen. The attention monitor module 161 (FIG. 1) determines a gaze vector representing the direction in which the eye is looking. In some embodiments, the attention monitor module 161 determines the gaze vector based on a plurality of eye characteristics associated with the eye, including an eyeball center (A in FIG. 7), a cornea center (C), a pupil (E), and a distance between cornea center and pupil center (h). In one embodiment, the eye tracking system 142 estimates these eye characteristics and sends the estimates to the attention monitor module 161 as part of the eye tracking information. In another embodiment, the module 161 receives the angular orientation of the eye from the eye tracking system 142 and generates these eye characteristics by applying a rotation to a model of the eye based on the angular rotation. In other embodiments, the attention monitor module 161 receives the foveal axis of the eye from the eye tracking system 142 and uses the direction of the foveal axis as the gaze vector 306. After determining the gaze vector 306, the module 161 determines the point of regard 314 by computing an intersection between the gaze vector 306 and the screen 304. In other embodiments, the point of regard 314 is computed by other means.

In another embodiment, two gaze vectors are separately determined for the user's two eyes, and the wearable display 128 determines the user's depth of focus based on the convergence of the two gaze vectors. In this embodiment, the wearable display 128 determines a difference in depth between the depth of focus and the depth values of objects in the scene (hereinafter referred to as a depth difference), so as to determine whether the first user concentrates her eyes on a particular object or user, or just resting the eyes without paying attention to the screen.

Figure 8:
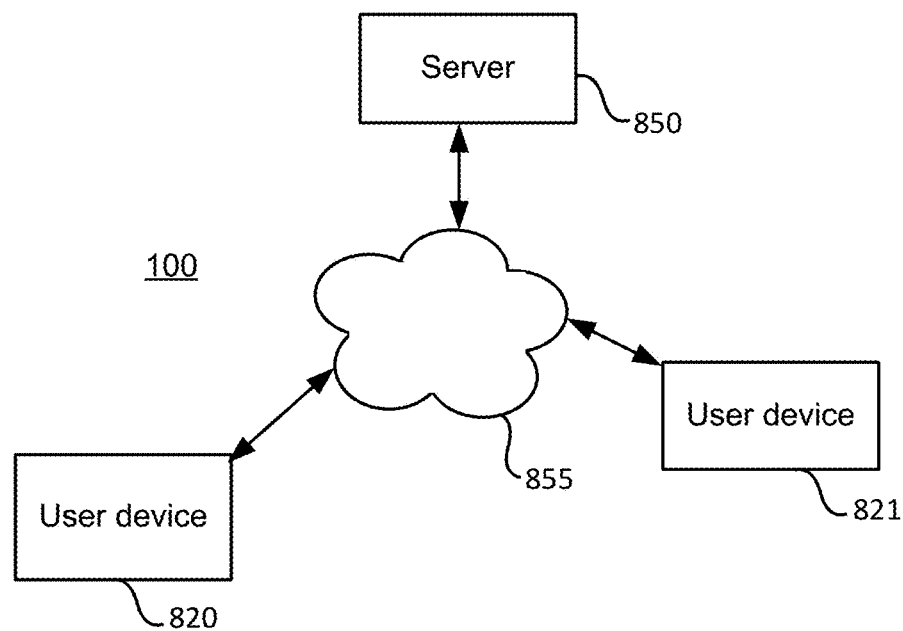
FIG. 8 is a block diagram of an example network environment for the AR/VR system of FIG. 1, in accordance with an embodiment.

FIG. 8 provides an example of the AR/VR system 100 in which methods of the present disclosure may be implemented. The AR/VR system 100 comprises a network 855, one or more servers 850 including the controller 152, and a plurality of user devices illustrated by the devices 820 and 821, e.g. the wearable displays 128 or 126. The server(s) 850 provide data to the user devices for displaying images, monitor user activity, and notify a user of attention paid to her by other user(s). The network 855 provides the means for communication between the servers 850 and user devices 820 and 821. The network 855 may be the Internet, a wireless or wired network such as a mobile device carrier network, or any other network that can be used for communication between a server and a client. User devices 820 and 821 may be HMDs, and each may include any suitable computing device, such as a desktop computer, or a mobile device, e.g., a mobile phone, a cell phone, a smart phone, a personal digital assistant, a notebook computer, a tablet computer, a laptop computer, a camera, a video camera, or a hand-held game console.

Figure 9:
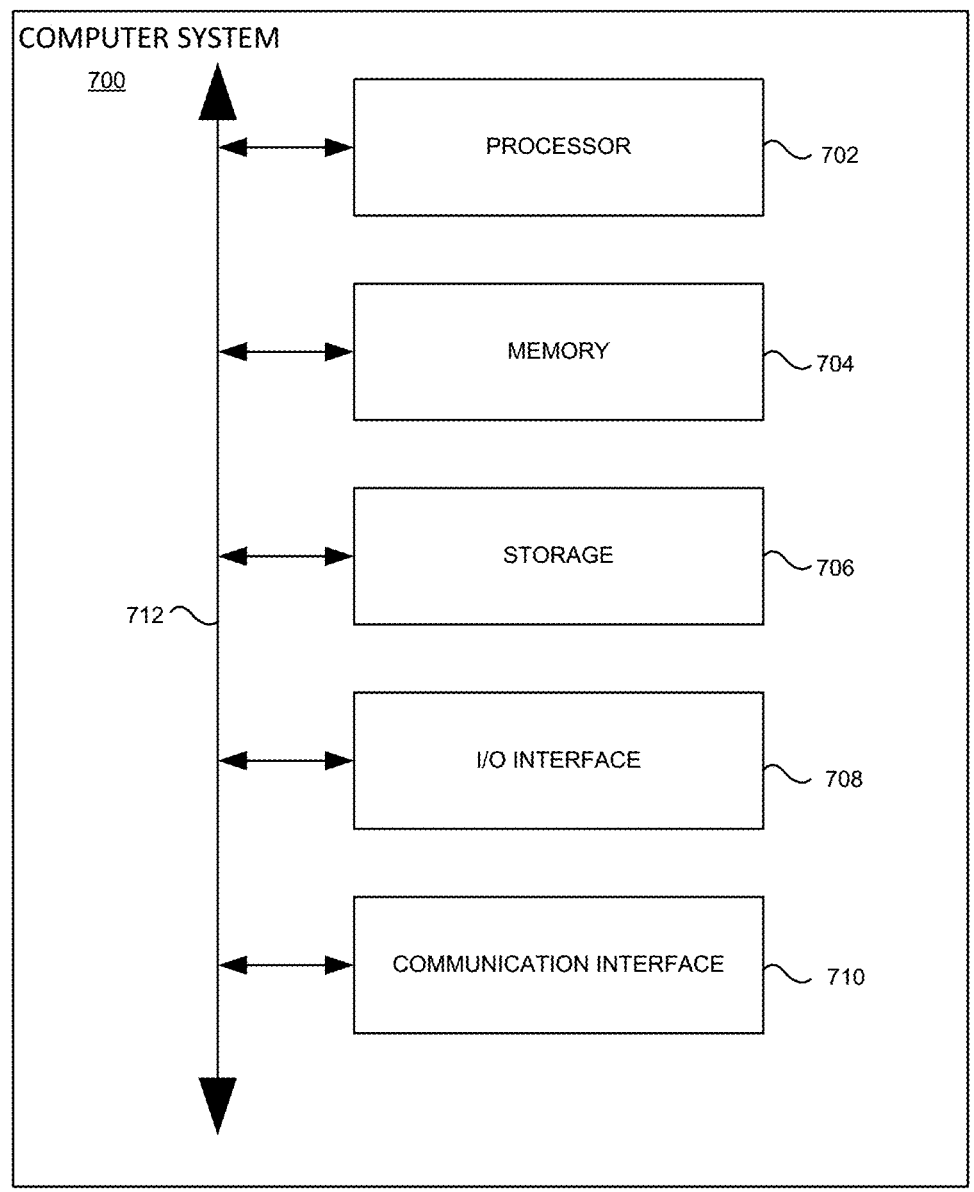
FIG. 9 is a block diagram of a computer system for implementing a method of the present disclosure.

FIG. 9 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, non-transitory memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, non-transitory memory 704, or storage 706; decode and execute them; and then write one or more results to an internal register, an internal cache, non-transitory memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, the non-transitory memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to the non-transitory memory 704.

In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. Storage 706 may include removable or non-removable (i.e., fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method in of an AR/VR system comprising a first wearable display for presenting a first AR/VR imagery to a first user of the AR/VR system, and a second wearable display for presenting a second AR/VR imagery to a second user of the AR/VR system, the method comprising:

presenting, using the second wearable display, the second AR/VR imagery to the second user of the AR/VR system, the second AR/VR imagery comprising a visual cue of a gaze of the first user of the AR/VR system directed to the second user or an avatar of the second user in the first AR/VR imagery presented to the first user, wherein a vergence of the gaze of the first user at the second user or the avatar of the second user in the first AR/VR imagery has been detected by a processor executing instructions to process eye tracking data of the first user.

2. The method of claim 1, wherein the second AR/VR imagery comprising the visual cue is displayed when the processor executed instructions to determine that eyes of the first user have looked at the second user or the avatar of the second user for at least a predefined time interval.

3. The method of claim 1, further comprising detecting, by the processor executing instructions to process the eye tracking data of the first user, the vergence of the gaze of the first user at the second user or the avatar of the second user in the first AR/VR imagery presented to the first user.

4. The method of claim 1, wherein the second AR/VR imagery comprising the visual cue is displayed when a pupil dilation of the first user has been detected.

5. The method of claim 1, wherein the second AR/VR imagery was absent the visual cue before the gaze of the first user was detected.

6. The method of claim 1, wherein the second AR/VR imagery comprising the visual cue is displayed to the second user when a direction or the vergence of the gaze of the first user has been determined by the processor at regular time intervals.

7. The method of claim 1, further comprising modifying the second AR/VR imagery to remove the visual cue when the gaze has been withdrawn for at least a pre-defined time interval.

8. A non-transitory memory having stored thereon instructions which, when executed by one or more processors, cause the one or more processors to display, using an AR/VR system comprising a first wearable display for presenting a first AR/VR imagery to a first user of the AR/VR system, and a second wearable display for presenting a second AR/VR imagery to a second user of the AR/VR system, the second AR/VR imagery to the second user of the AR/VR system, the second AR/VR imagery comprising a visual cue of a gaze of the first user of the AR/VR system directed to the second user or an avatar of the second user in the first AR/VR imagery presented to the first user, wherein a vergence of the gaze of the first user at the second user or the avatar of the second user has been detected by a processor executing instructions to process eye tracking data of the first user.

9. The non-transitory memory of claim 8, wherein the second AR/VR imagery comprising the visual cue is displayed when the one or more processors executing the instructions have determined that eyes of the first user have looked at the second user or the avatar of the second user for at least a predefined time interval.

10. The non-transitory memory of claim 8, further comprising the instructions which, when executed by the one or more processors, cause the one or more processors to detect, by processing the eye tracking data of the first user, the vergence of the gaze of the first user at the second user or the avatar of the second user in the first AR/VR imagery presented to the first user.

11. The non-transitory memory of claim 8, wherein the second AR/VR imagery comprising the visual cue is displayed when a pupil dilation of the first user has been detected.

12. The non-transitory memory of claim 8, wherein the second AR/VR imagery was absent the visual cue before the gaze of the first user was detected.

13. The non-transitory memory of claim 8, wherein the second AR/VR imagery comprising the visual cue is displayed to the second user when a direction or the vergence of the gaze of the first user has been determined by the one or more processors at regular time intervals.

14. The non-transitory memory of claim 8, wherein the second AR/VR imagery is modified to remove the visual cue when the gaze has been withdrawn for at least a pre-defined time interval.

15. An AR/VR system comprising:

a first wearable display for presenting a first AR/VR imagery to a first user, the first wearable display comprising an eye tracking system for determining a gaze direction and a gaze vergence of the first user;

a second wearable display for presenting a second AR/VR imagery to a second user; and a controller communicatively coupled to the first and second wearable displays and configured to provide data to the first wearable display for presenting the first AR/VR imagery to the first user, the controller comprising an attention monitor configured to receive data related to eye tracking of the first user from the first wearable display and identifying the gaze vergence of the first user at the second user or an avatar of the second user in the first AR/VR imagery, the controller configured to, upon detecting the gaze vergence, provide data to the second wearable display for displaying the second AR/VR imagery to the second user, the second AR/VR imagery comprising a visual cue of the gaze vergence of the first user.

16. The AR/VR system of claim 15, wherein the attention monitor is configured to determine that eyes of the first user look at the second user or the avatar of the second user in the first AR/VR imagery for at least a predefined time interval.

17. The AR/VR system of claim 15, comprising at least one processor configured to detect, by processing the eye tracking data of the first user, the vergence of the gaze of the first user at the second user or the avatar of the second user in the first AR/VR imagery presented to the first user.

18. The AR/VR system of claim 15, wherein the attention monitor is configured to determine at least one of the gaze direction, the gaze vergence, or a pupil dilation of the first user at regular time intervals.

19. The AR/VR system of claim 15, wherein the attention monitor is configured to monitor the gaze of the first user over time, and modify the second AR/VR imagery to remove the visual cue when the gaze has been withdrawn for at least a pre-defined time interval.

* * * * *